(12) United States Patent
Satou (10) Patent No.: US 6,517,212 B2
(45) Date of Patent: Feb. 11, 2003

(54) PROJECTION TYPE DISPLAY

(75) Inventor: Yasuhito Satou, Yaita (JP)

(73) Assignee: Sharp Kabushiki Kaisha, Osaka (JP)

(*) Notice: Subject to any disclaimer, the term of this patent is extended or adjusted under 35 U.S.C. 154(b) by 8 days.

(21) Appl. No.: 09/732,973

(22) Filed: Dec. 8, 2000

(65) Prior Publication Data

US 2002/0071103 A1 Jun. 13, 2002

(30) Foreign Application Priority Data

Dec. 8, 2000 (JP) .......................................... 11-349317

(51) Int. Cl.$^7$ .............................................. G03B 21/28
(52) U.S. Cl. .............................. 353/99; 353/38; 353/31
(58) Field of Search ............................... 353/38, 51, 81, 353/98, 99

(56) References Cited

U.S. PATENT DOCUMENTS

| | | | | |
|---|---|---|---|---|
| 3,450,461 A | * | 6/1969 | Takayanagi | 348/755 |
| 3,770,344 A | * | 11/1973 | Fukushima | 353/38 |
| 4,394,717 A | * | 7/1983 | Brockwell | 362/247 |
| 5,300,966 A | * | 4/1994 | Uehira et al. | 353/30 |
| 5,765,934 A | * | 6/1998 | Okamori et al. | 353/38 |
| 6,193,393 B1 | * | 2/2001 | Dove et al. | 362/247 |
| 6,196,699 B1 | * | 3/2001 | Stanton | 362/235 |
| 6,224,217 B1 | * | 5/2001 | Tanaka | 353/31 |

FOREIGN PATENT DOCUMENTS

| | | | | |
|---|---|---|---|---|
| JP | 11096803 | | 4/1999 | |
| JP | 11096803 A | * | 4/1999 | ............ F21M/1/00 |

OTHER PUBLICATIONS

*Projector of New Generation: Second of Sirius Series—"Sirius Pro" TH–L 797J*, Seiji Minami, Takehiro Okada, Monthly Display, vol. 5, No. 4, pp. 62–66, 1999.

* cited by examiner

*Primary Examiner*—Russell Adams
*Assistant Examiner*—D. Ben Esplin
(74) *Attorney, Agent, or Firm*—Edwards & Angell, LLP; David G. Conlin; Richard J. Roos (57) ABSTRACT

In a projection type display, light rays emitted from two light sources pass through an integrator made up of fly-eye lenses or the like, and proceed through predetermined light paths including condenser lenses, and are focused on liquid crystal light valves of liquid crystal panels or the like, where the light rays are converted into video information. This projection type display includes: two light sources; two parabolic reflectors for condensing light rays from the light sources; and a multiple number of prisms for dividing the light rays condensed by the parabolic reflectors in the substantially same direction into multiple elongate rectangular sections.

10 Claims, 8 Drawing Sheets

PROJECTION TYPE DISPLAY

BACKGROUND OF THE INVENTION (1) Field of the Invention

The present invention relates to a projection type LCD projector, and in particular is directed to angle control of the illumination light of the liquid crystal display in an LCD projector.

(2) Description of the Prior Art

In conventional projection type LCD systems such as LCD projectors, light rays emitted from the light source lamp are radiated to liquid crystal light valves, where the radiated light rays are modulated in accordance with the image to be displayed so as to form a projected image on the screen by way of the projection optical system.

However, a further improvement in luminance has been demanded in order to achieve improvement of high-efficiency design for the optical system, for using a high-power light source lamp, or for a system using a multiple number of illumination lamps. For example, the usefulness of a system including a multiple number of illumination lamps is evaluated based on the lighting control function of controlling the number of the lamps or the countermeasure against the loss or damage of one of the lamps.

As disclosed in Japanese Patent Application Laid-Open Hei 11 No.96803 and 'Gekkan Display(Monthly Display)' Vol.5 No.4 issued by Techno-Times, April 1999, a light source device for a projection type display using a plurality of illuminating light sources has been disclosed.

Figure 1:
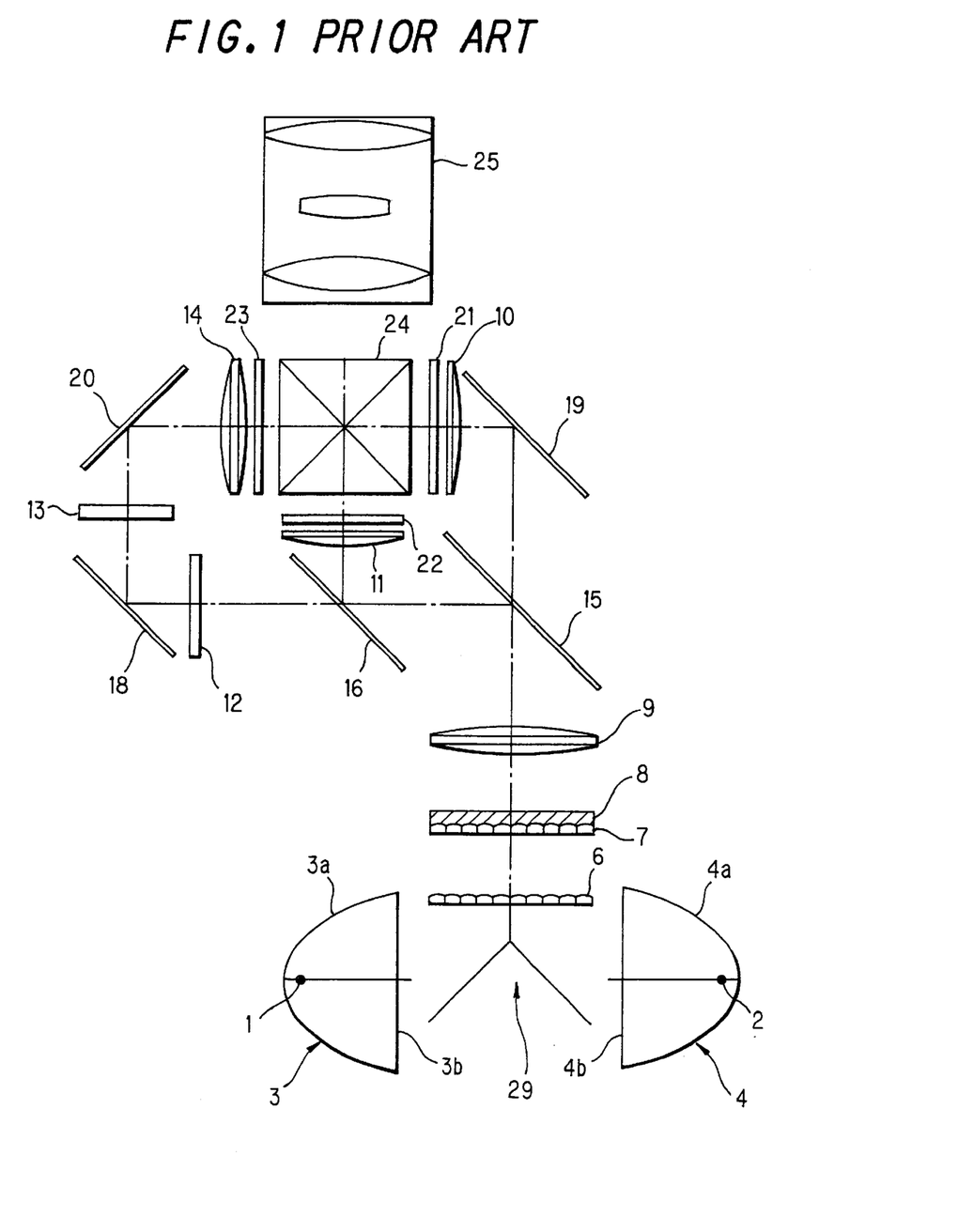
FIG. 1 is a schematic view showing the configuration of optical elements in a conventional projection type display.

Now, this light source device will be described with reference to the drawings. FIG. 1 is a schematic view showing the configuration of optical elements in a conventional projection type display.

As shown in FIG. 1, the configuration of the light source device includes: for example, light sources 1 and 2; reflectors 3 and 4 for reflecting light rays emitted from light sources 1 and 2; and a reflection mirror 29 for reflecting the light rays, which are reflected by reflectors 3 and 4, in the same direction. The reflectors 3 and 4 are arranged opposing each other with reflection mirror 29 in between. This reflection mirror 29 has two facets being arranged in an inverted V geometry, being inclined 45° with respective reflectors 3 and 4.

Light rays emitted from light source 1 and reflected by reflector 3 and light rays emitted from light source 2 and reflected by reflector 4 are reflected by reflection mirror 29 in the same direction and pass through a pair of fly-eye lenses 6 and 7 and polarizer 8, being focused by condenser lenses 9 to 14 and color separation/reflection mirrors 15 to 20, onto video signal conversion light valves 21 to 23. Video signals for three color separation components are integrated into one optical path by means of a color composition prism 24 so that the composited image is enlarged and projected by a projection lens 25.

However, in the above configuration, since the angular characteristics of the incident light on color separation/reflection mirrors 15 to 20, color composition prism 24 and projection lens 25 differ between the light from light source 1 and that from light source 2, there occurs the color unevenness problem due to the difference in luminance between light sources 1 and 2 or the color unevenness problem arising during projection with one light source.

Now, comparison as to angular distributions of incident rays will described with reference to the drawings.

Figure 2:
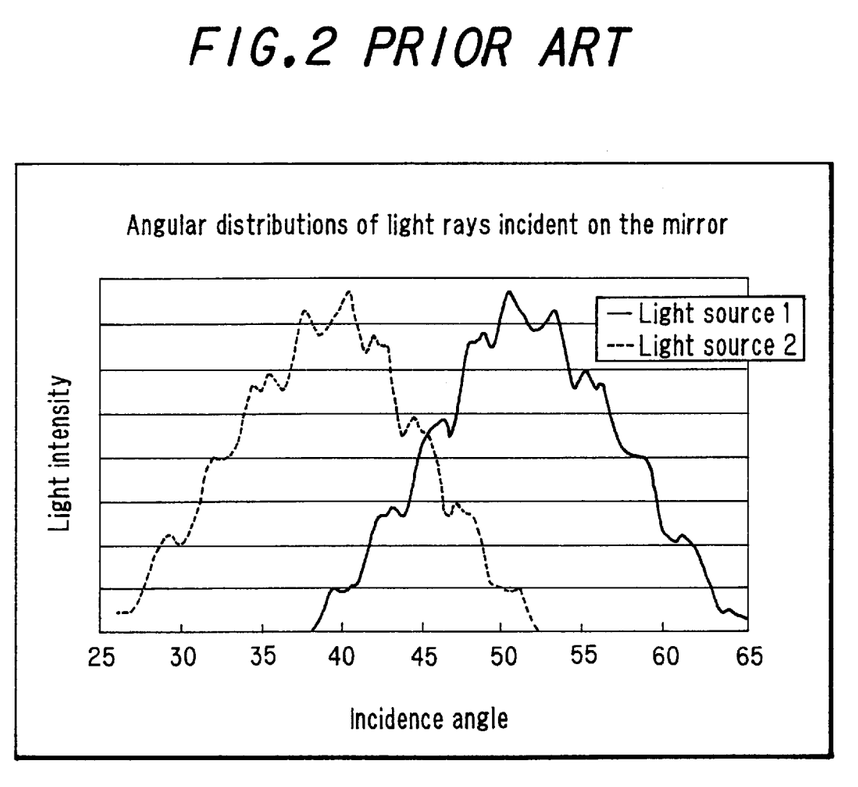
FIG. 2 is a chart showing the angular distributions of the intensity of light incident on a mirror in a conventional configuration.
Figure 3A:
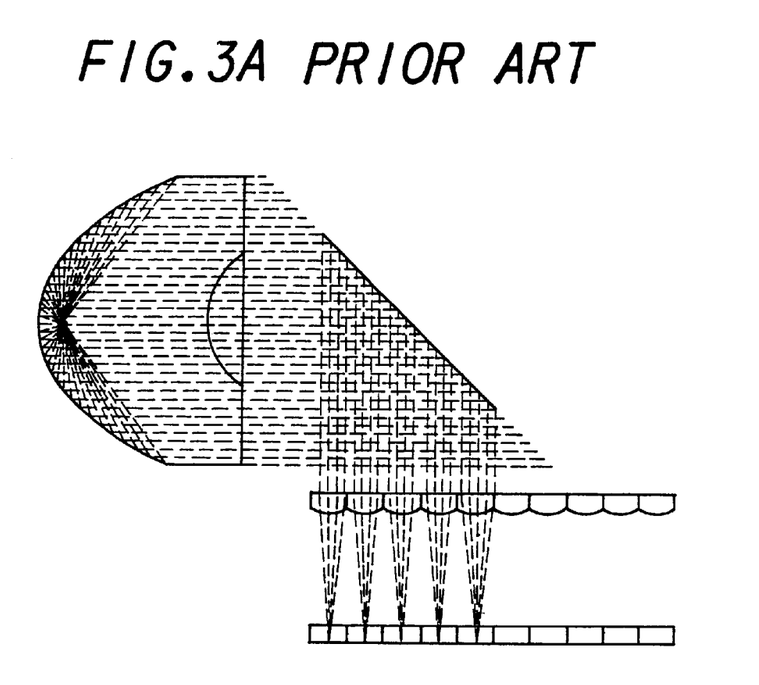
FIG. 3A is an illustrative view showing the propagation of light in a conventional projection type display and FIG. 3B is an illustrative view showing the distribution of the intensity of light with a conventional mirror configuration.
Figure 3B:
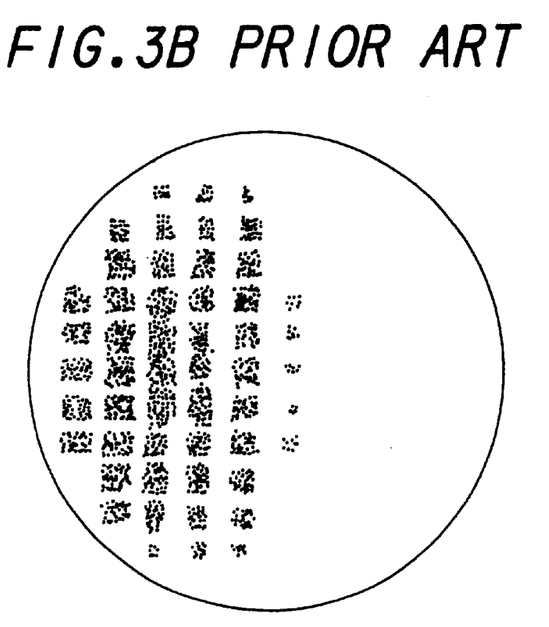

FIG. 2 is a graph showing the angular distributions of the intensity of light incident on a mirror using the conventional reflection mirror. FIG. 3A is an illustrative view showing the optical paths when the conventional reflection mirror is used. FIG. 3B is an illustrative view showing the distribution of the intensity of light with the conventional reflection mirror.

Angular distributions of the intensity of light incident on a mirror using the conventional reflection mirror, as shown in FIG. 2, represent the intensity of light depending on the incidence angle of light rays from light sources 1 and 2 incident on a color separation/reflection mirror 15. It is understood from FIG. 1 that the color separation spectral characteristics of color separation/reflection mirror 15 differ depending on the difference in angular distribution between incident light from light source 1 and that from light source 2. This is why color unevenness occurs.

Next, concerning the distribution of the intensity of light rays from light source 1 at the pupil of the projection lens, FIGS. 3A and 3B represent the distribution of the intensity of light at the center (the LCD center) of the image height on the object plane of the projection lens. Since the picked up intensity of light varies as the image height changes, the pupil will become compressed as the image height is greater. Therefore, the pickup light intensity at the projection lens deviates and hence disturbs the color balance due to the difference in design of the angular distribution of the B-ch light rays which are once inverted, from the angular distributions of the R-ch and G-ch light rays. Thus, color unevenness occurs in the resultant enlarged projected image.

SUMMARY OF THE INVENTION

The present invention has been devised in view of the above conventional problems and it is therefore an object of the present invention to provide a projection type display which is improved to reduce color unevenness, without causing any offset of the angular distributions of light rays through the color separation mirrors, color composition prism and projection lens, attributed to the light sources.

In order to achieve the above object, the present invention is configured as follows:

In accordance with the first aspect of the present invention, a projection type display, wherein light rays emitted from light sources pass through an integrator including fly-eye lenses and proceed through predetermined light paths including condenser lenses and are focused on liquid crystal light valves of liquid crystal panels or the like, where the light rays are converted into video information, includes: a plurality of light sources; a plurality of reflectors for condensing the light rays from the light sources; and a multiple number of separation/reflection means for dividing the light rays condensed by the reflectors in the substantially same direction into multiple elongate rectangular sections.

In accordance with the second aspect of the present invention, the projection type display having the above first feature is characterized in that the width of the reflection light rays divided by the separation/reflection means is set equal to an integral multiple of a single cell width of the fly-eye lens.

In accordance with the third aspect of the present invention, the projection type display having the above first feature is characterized in that the separation/reflection means is made up of a multiple number of prisms being arranged in an array, each having the two sides defining the right-angled portion formed with a reflective coating.

In accordance with the fourth aspect of the present invention, the projection type display having the above second feature is characterized in that the separation/reflection means is made up of a multiple number of prisms being arranged in an array, each having the two sides defining the right-angled portion formed with a reflective coating.

In accordance with the fifth aspect of the present invention, the projection type display having the above first feature is characterized in that the separation/reflection means is made up of a multiple number of glass substrates having reflective portions and transparent portions formed alternately thereon, the glass substrates being arranged in a zigzag manner.

In accordance with the sixth aspect of the present invention, the projection type display having the above second feature is characterized in that the separation/reflection means is made up of a multiple number of glass substrates having reflective portions and transparent portions formed alternately thereon, the glass substrates being arranged in a zigzag manner.

In accordance with the seventh aspect of the present invention, the projection type display having the above first feature is characterized in that the separation/reflection means is configured of prisms arranged in an array, the opposing side of the right-angled portion of each prism being used as the reflective surface.

In accordance with the eighth aspect of the present invention, the projection type display having the above second feature is characterized in that the separation/reflection means is configured of prisms arranged in an array, the opposing side of the right-angled portion of each prism being used as the reflective surface.

In accordance with the ninth aspect of the present invention, the projection type display having one of the above first through eighth features further comprises a control means for activating and deactivating the multiple number of light sources.

According to the present invention, provision of multiple light sources and multiple reflectors for condensing the light rays from the light sources makes it possible to enhance the luminance of projection light. Further, provision of a separation/reflection means for dividing the light rays condensed by the reflectors in the substantially same direction into multiple elongate rectangular sections makes it possible to provide offset-free angular distributions of light rays incident on the color separation/reflection mirror and offset-free angular distributions of light rays incident on the projection lens, whereby it is possible to reduce color unevenness of the projected image.

Since the width of the reflection light rays divided by the separation/reflection means is set equal to an integral multiple of a single cell width of the fly-eye lens, it is possible to produce offset-free angular distributions of light rays incident on the color separation/reflection mirror and incident on the projection lens.

Since the separation/reflection means is made up of a multiple number of prisms being arranged in an array, each having the two sides defining the right-angled portion formed with a reflective coating, the necessary functions can be achieved by a simple configuration using a multiple number of small reflective mirrors in a minimum space.

Since the separation/reflection means uses glass substrates having reflective mirror coatings, the same effect as above can be obtained by a low-price configuration.

Since the opposing side of the right-angled portion of each prism is made use of based on the total reflection principle as the reflective surface in the separation/reflection means, it is possible to reduce color unevenness across the projected image in a more improved manner than when reflective coatings are used.

Since provision of a control means for activating and deactivating the multiple number of light sources makes it possible to provide a lighting system using ON/OFF combination of the multiple light sources, thus providing a further improved distribution of the intensity of light.

DESCRIPTION OF THE PREFERRED EMBODIMENTS

The embodiment of the present invention will hereinafter be described in detail with reference to the accompanying drawings.

Figures 4A, 4B:
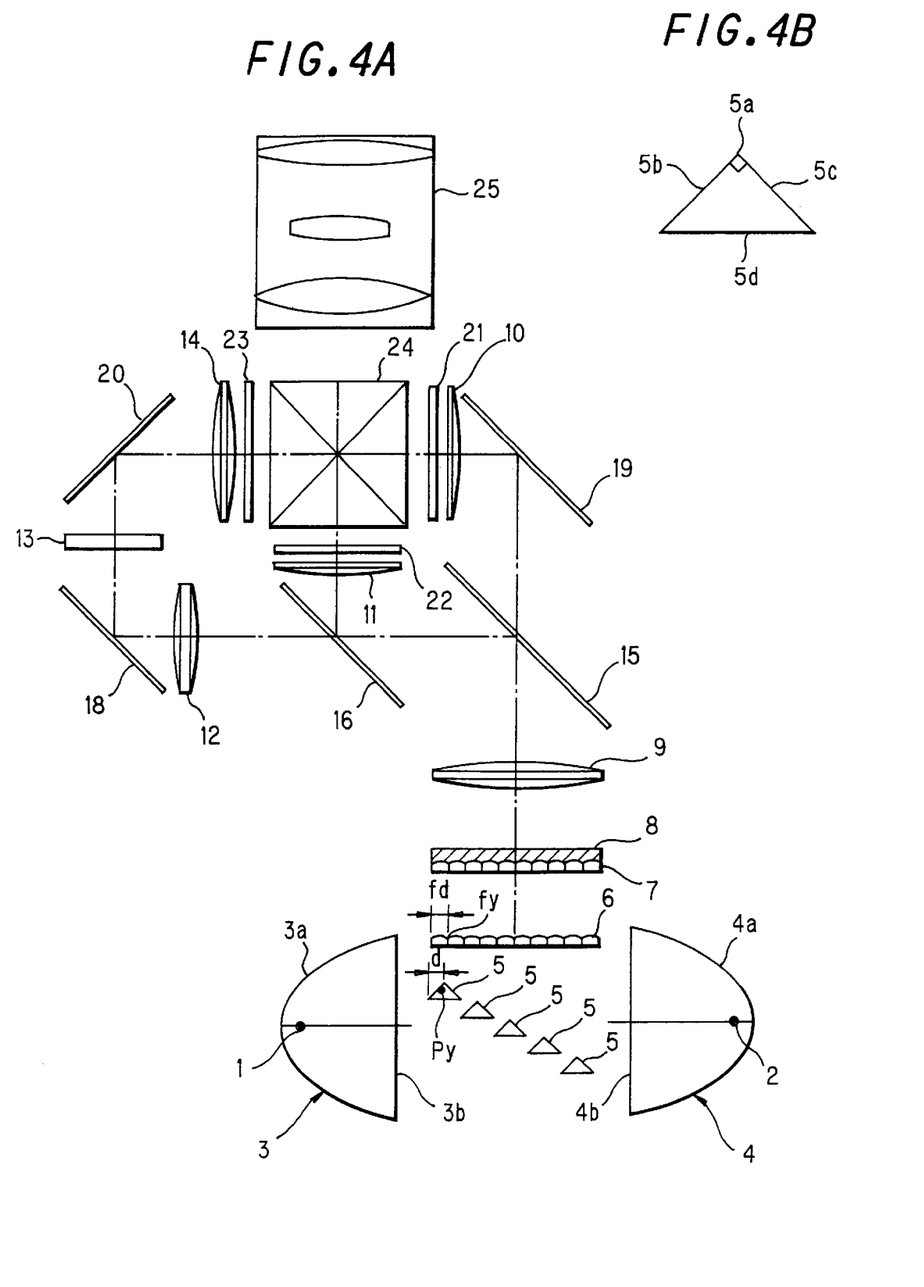
FIG. 4A is a schematic view showing the configuration of optical elements in a projection type display in accordance with the present invention and FIG. 4B is a detailed view of a triangle prism as a part of the optical components.
Figure 5A:
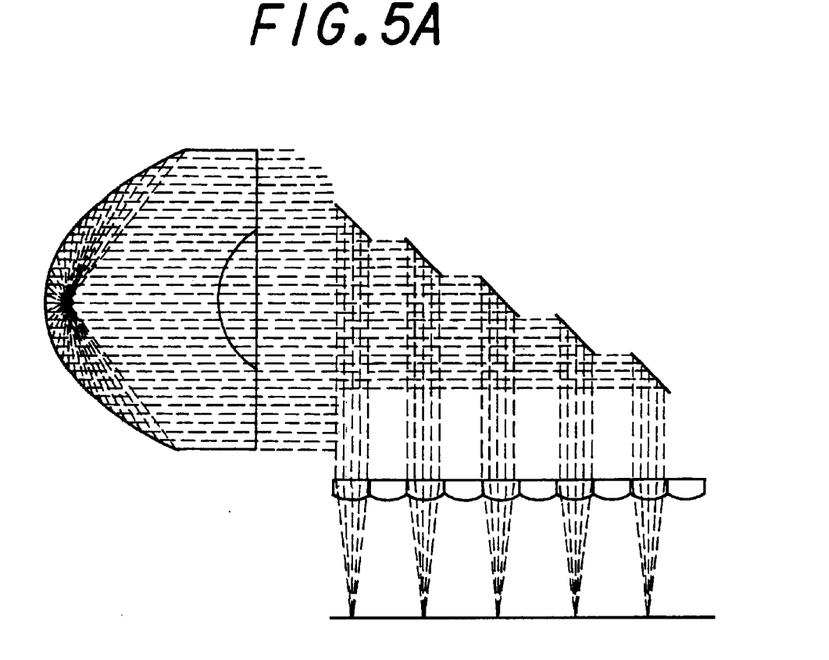
FIG. 5A is an illustrative view showing the propagation of light paths in the embodiment where triangle prisms are used and FIG. 5B is an illustrative view showing the distribution of the intensity of light with a triangle prism configuration of the present embodiment.
Figure 5B:
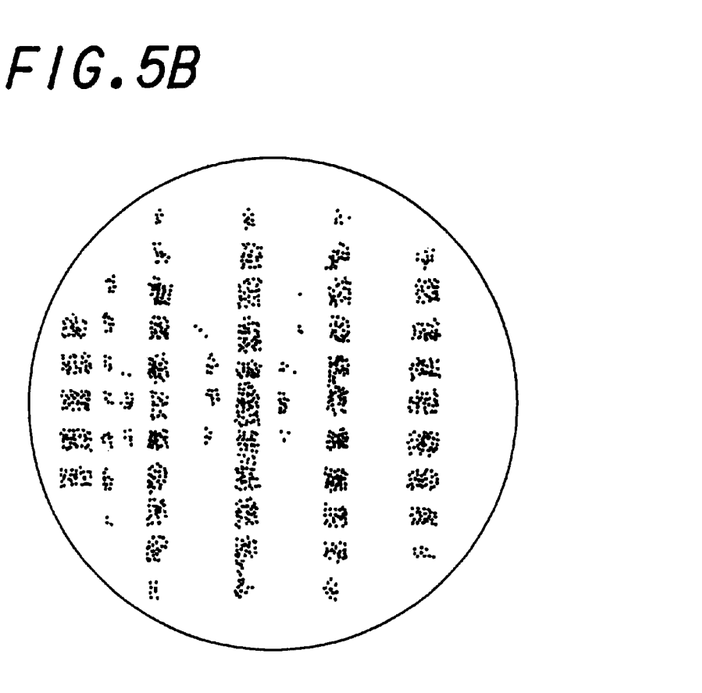

FIG. 4A is a schematic view showing the configuration of optical elements in a projection type display in accordance with the present invention. FIG. 4B is a front view showing the detail of a triangle prism of the embodiment. FIG. 5A is an illustrative view showing the propagation of light in the embodiment where triangle prisms are used. FIG. 5B is an illustrative view showing the distribution of the intensity of light rays with a triangle prism configuration of the present embodiment.

A projection type display of the present embodiment is configured as shown in FIG. 4A. That is, in the projection type display, light rays emitted from light sources 1 and 2 pass through an integrator made up of fly-eye lenses 6 and 7 etc., and proceed through predetermined light paths including condenser lenses 9 to 14, and are focused on liquid crystal light valves 21 to 23 of liquid crystal panels or the like, where the light rays are converted into video information. This projection type display includes two light sources 1 and 2, parabolic reflectors 3 and 4 for condensing light rays from light sources 1 and 2, and a multiple number of prisms 5 for dividing the light rays condensed by parabolic reflectors 3 and 4 in the substantially same direction into multiple elongate rectangular sections.

Parabolic reflectors 3 and 4 enclose respective light sources 1 and 2, and are composed of reflecting plates 3a and 4a for reflecting light from light sources 1 and 2 and openings 3b and 4b for allowing the reflected light to go out. These parabolic reflectors 3 and 4 are arranged so that openings 3b and 4b oppose each other with a multiple number of prisms 5 disposed therebetween.

Each prism 5, as shown in FIG. 4B, has a right-angled portion 5a, two sides (which will be referred to hereinbelow as inclined surfaces) 5b and 5c defining the right-angled portion 5a, and the other side (which will be referred to hereinbelow as the bottom surface) 5d. The surfaces of inclined sides 5b and 5c are metalized with visible-light enhanced aluminum deposition or with cold-mirror deposition, the width 'd' of the inclined side is designed to be an integral multiple of a single cell width 'fd' of the fly-eye lens and the boundary 'fy' between fly-eye lens cells is made to correspond to the optical composition boundary 'py'.

Each prism 5 is arranged so as to be substantially perpendicular to parabolic reflectors 3 and 4. More clearly, the prism is positioned so that inclined sides 5b and 5c are angled 45° with openings 3b and 4b of parabolic reflectors 3 and 4, respectively while right-angled portion 5a is positioned so as to be directed on the predetermined optical path.

The prisms 5 are arranged so that adjacent prisms 5 are substantially parallel with the optical axis of light sources 1 and 2. Further, the prisms are arranged stepwise so as to be shifted along the optical axis by the dimension substantially equal to the width of bottom side 5d and shifted along the optical path by the dimension substantially equal to the height of the prism.

Next, the operation of this embodiment will be described.

First, light rays emitted from optical sources 1 and 2 are condensed in the opposing directions by parabolic reflectors 3 and 4, as shown in FIGS. 4A and 5A. The light rays thus condensed are reflected at approximately right angles by the prisms 5 arranged stepwise. The light rays pass through pair fly-eye lenses 6 and 7 and polarizer 8, and then focused on video signal conversion light valves 21 to 23 by means of condenser lenses 9 to 14 and color separation/reflection mirrors 15 to 20. The video signals thus color separated into three color components by video signal conversion light valves 21 to 23 are joined by a color composition prism 24 into one optical path so that the image is enlarged and projected by a projection lens 25.

Figure 6:
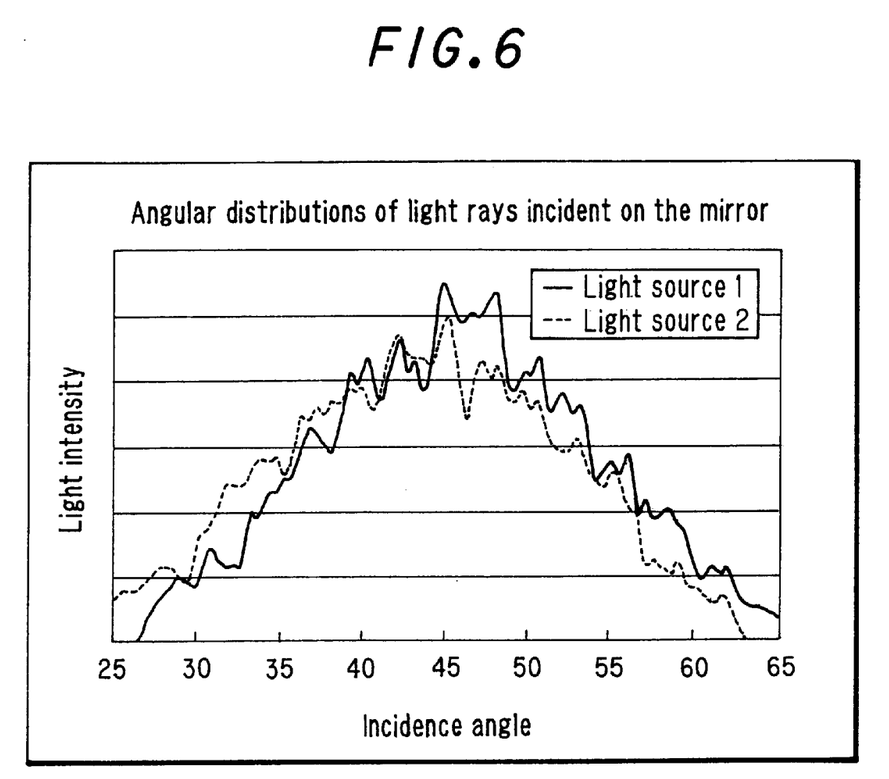
FIG. 6 is a chart showing the angular distributions of the intensity of incident light.

According to the prism arrangement of the present embodiment, both the angular distributions of the intensity of light from light sources 1 and 2 dependent on the incident angle are axially symmetrical about near 45° as shown in FIG. 6, in comparison with the angular distributions of the intensity of light rays incident on a reflection mirror in the conventional configuration shown in FIG. 2. Therefore, it is possible to reduce occurrence of color unevenness due to the light source difference.

Since the offset, on the pupil, of the projection lens pupil image of the light rays from the light sources can be reduced as shown in FIG. 5B, the difference in the intensity of light between color components picked up by the projection lens can be reduced, thus making it possible to reduce occurrence of color unevenness.

According to the arrangement of prisms 5 of the present embodiment, light rays from light sources 1 and 2 are separated comb-like so as to interpolate the gaps of each light source with those of the other light source. That is, light beams from light sources 1 and 2 are arranged alternately, whereby it is possible to cancel the light intensity difference dependent on the incident angle due to light source difference. Further, the apparent width 'd' viewed from the fly-eye lens 6 side is designed to be equal to an integral multiple of the single cell width 'fd' of the fly-eye lens and the boundary 'fy' between fly-eye lens cells is made to correspond to optical composition boundary 'py' so that it is possible to reduce the difference in luminance across the projected image due to light source difference.

Figure 7A:
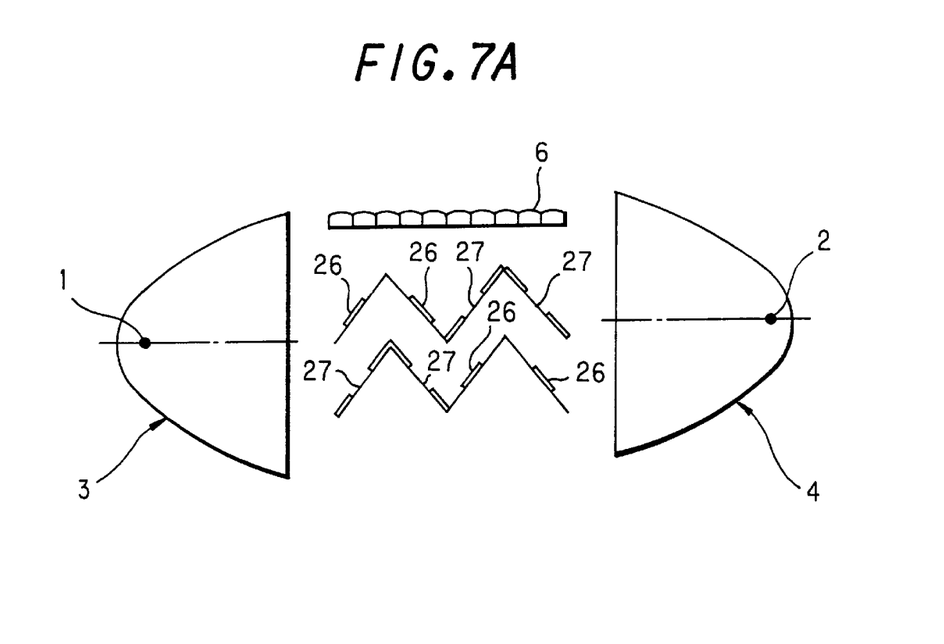
FIG. 7A is a schematic view showing the configuration of optical elements in a projection type display of the first variational example of the present embodiment.

In the present embodiment, though multiple prisms 5 are arranged stepwise at substantially regular intervals, this should not limit the present invention. For example, as the first variational example, as shown in FIG. 7A, glass substrates 26 and 27 having reflective portions of visible light enhanced reflection aluminum deposition or cold mirror deposition and transparent portions, formed alternately thereon may be arranged alternately zigzag while being inclined 45° with respect to the respective openings of the parabolic reflectors and two rows of such zigzags may be arranged in a staggered manner.

Figure 7B:
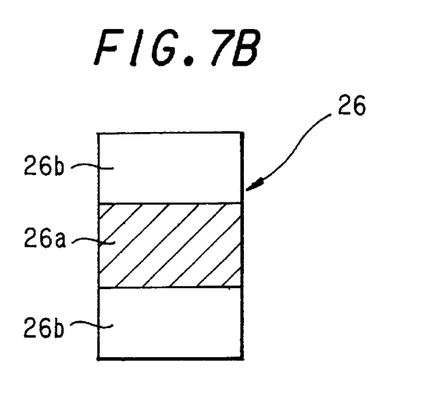
FIG. 7B is a detailed view showing the configuration of a reflection mirror 26 in the first variational example and FIG. 7C is a detailed view showing the configuration of a reflection mirror 27 in the first variational example.
Figure 7C:
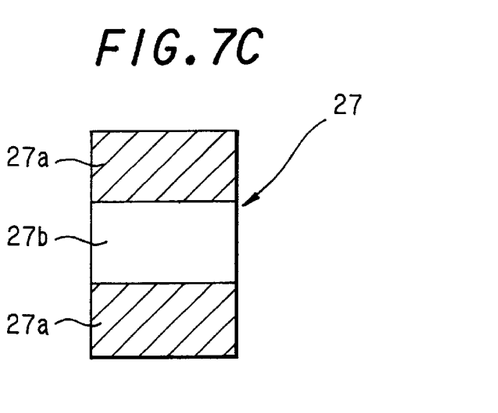

FIGS. 7B and 7C show the details of reflection mirrors 26 and 27 of the first variational example.

Figure 8:
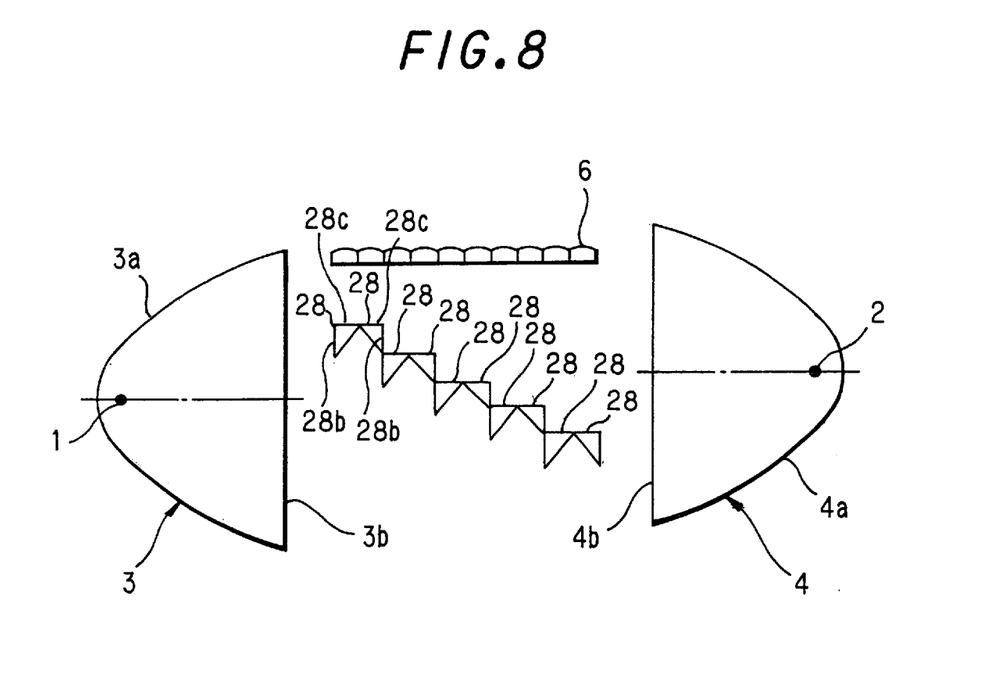
FIG. 8 is a schematic view showing the configuration of optical elements in a projection type display of the second variational example of the present embodiment.

As the second variational example, as shown in FIG. 8, a pair of total reflection prisms 28 may be arranged and joined opposing each other in the following manner. That is, inclined side 28b of one prism is arranged in substantially parallel with opening 3b of parabolic reflector 3 and the other inclined side 28c is directed normal to the optical path while inclined side 28b of another prism is arranged in substantially parallel with opening 4b of parabolic reflector 4 and the other inclined side 28c is directed normal to the optical path, and multiple pairs of such prisms are arranged repeatedly stepwise similarly to the above embodiment.

In both the first and second variational examples, the mixing effect of light rays from two light sources 1 and 2 makes it possible, as in the manner shown in FIG. 6, to reduce different in luminance of light sources 1 and 2 and eliminate offset in angular distributions of light incident on the color separation mirror, color composition prism and projection lens, which would occur when a single light source only on one side is turned on.

As a further example, a projection type display using multiple light sources may have a light source controller for arbitrarily or regularly turning on and off the light sources. In this case, lighting can be controlled by ON/OFF combination of the multiple light sources, providing a further improved distribution of the intensity of light.

As has been illustrated, according to the present invention, a projection type display includes a multiple number of light sources, a multiple number of reflectors, a multiple number of separation/reflection means such as of prisms. In such a display apparatus, light rays from the multiple light sources are mixed so as to provide offset-free angular distributions of light incident on the color separation/reflection mirror and offset-free angular distributions of light incident on the projection lens, whereby it is possible to reduce color unevenness of the projected image.

The separation/reflection means may be configured by alternate arrangement of the reflective portions of visible light enhanced reflection aluminum deposition or cold mirror deposition and transparent portions, thus making it possible to mix light rays from multiple light sources with an easy and simple configuration.

Finally, effective use of prisms makes it possible to provide an excellent effect of reducing color unevenness across the projected image.

What is claimed is:

1. A projection type display, wherein light rays emitted from light sources pass through an integrator including fly-eye lenses and proceed through predetermined light paths including condenser lenses and are focused on liquid crystal light valves of liquid crystal panels or the like, where the light rays are converted into video information, comprising:

a plurality of light sources;

a plurality of reflectors for condensing the light rays from the light sources; and a multiple number of separation/reflection means for dividing the light rays condensed by the reflectors in the substantially same direction into multiple elongate rectangular sections, wherein each of the multiple number of separation/reflection means is comprised of a multiple number of prisms arranged in an array, and wherein the width of the reflection light rays divided by the multiple number of separation/reflection means is set equal to an integral multiple of a single cell width of the fly-eye lens.

2. The projection type display according to claim 1, wherein each array has two sides defining the right-angled portion formed with a reflective coating.

3. The projection type display according to claim 1, wherein the separation/reflection means is made up of a multiple number of prisms being arranged in an array, each having the two sides defining the right-angled portion formed with a reflective coating.

4. The projection type display according to claim 1, wherein the separation/reflection means is made up of a multiple number of glass substrates having reflective portions and transparent portions formed alternately thereon, the glass substrates being arranged in a zigzag manner.

5. The projection type display according to claim 1, wherein the separation/reflection means is made up of a multiple number of glass substrates having reflective portions and transparent portions formed alternately thereon, the glass substrates being arranged in a zigzag manner.

6. The projection type display according to claim 1, wherein the separation/reflection means is configured of prisms arranged in an array, the opposing side of the right-angled portion of each prism being used as the reflective surface.

7. The projection type display according to claim 1, wherein the separation/reflection means is configured of prisms arranged in an array, the opposing side of the right-angled portion of each prism being used as the reflective surface.

8. The projection type display according to any one of claims 1, 2, 3, 4, 5, 6, and 7, further comprising a control means for activating and deactivating the multiple number of light sources.

9. A projection type display, wherein light rays emitted from light sources pass through an integrator including fly-eye lenses and proceed through predetermined light paths including condenser lenses and are focused on liquid crystal light valves of liquid crystal panels or the like, where the light rays are converted into video information, comprising:

a plurality of light sources;

a plurality of reflectors for condensing the light rays from the light sources; and a multiple number of separation/reflection means for dividing the light rays from two light sources that are arranged alternately, wherein the light rays are condensed by the reflectors in the substantially same direction into multiple elongate rectangular sections, and wherein the width of the reflection light rays divided by the multiple number of separation/reflection means is set equal to an integral multiple of a single cell width of the fly-eye lens.

10. A projection type display, wherein light rays emitted from light sources pass through an integrator including fly-eye lenses and proceed through predetermined light paths including condenser lenses and are focused on liquid crystal light valves of liquid crystal panels or the like, where the light rays are converted into video information, comprising:

a plurality of light sources;

a plurality of reflectors for condensing the light rays from the light sources; and a multiple number of separation/reflection means for dividing the light rays condensed by the reflectors in the substantially same direction into multiple elongate rectangular sections, wherein each of the multiple number of separation/reflection means is comprised of a multiple number of prisms being arranged in an array, each array having two sides defining the right-angled portion formed with a reflective coating, and wherein the width of the reflection light rays divided by the multiple number of separation/reflection means is set equal to an integral multiple of a single cell width of the fly-eye lens.

* * * * *